Patented Sept. 14, 1937

2,093,120

UNITED STATES PATENT OFFICE 2,093,120

BARBITURIC ACID COMPOUND

Werner Ursum, Berlin-Wilmersdorf, Germany, assignor to firm E. Taeschner, Chem.-pharm. Fabrik, Potsdam, Germany No Drawing. Application November 26, 1935, Serial No. 51,631. In Germany November 10, 1933

5 Claims. (Cl. 260—33)

This invention relates to the production of new barbituric acid compounds.

It has been found that diethyl barbituric acid has the property of being able to form compounds with bromacyl ureas, e. g. α-bromisovaleryl urea. On further investigation, it was found that this property is possessed by all barbituric acids dialkylated or alkyl-arylated in the 5.5-position.

Compounds of this nature were hitherto unknown. When they were examined it was also found that these compounds possessed novel therapeutic properties. Thus the compounds do not produce the secondary effects which are peculiar to the known barbituric acid derivatives. The new compounds when used as soporifics are considerably less poisonous than the corresponding barbituric acid derivatives, and no after-effects in the form of giddiness and tiredness are experienced in the days following administration of the compound.

The new compounds are obtained, in general, by melting together the starting materials in molecular proportions for example in the proportion of 1:1, 1:2, or 2:1. Care should be taken that the melt does not reach a higher temperature than a temperature corresponding approximately to the melting point of the higher melting component, since otherwise a decomposition of the compounds present can easily occur.

That the new products are actually chemical compounds and not only mixtures will be clear from the following considerations. Firstly the starting materials cannot be separated again by means of solvents from the products which are obtained by the process according to the present invention. Secondly, on being recrystallized several times the various fractions have an invariable melting point.

In particular, it was found on examination with solvents that the solubility of the new compounds was considerably higher than the solubility of the individual constituents. In chloroform, in particular, the increased solubility of the new compounds was specially noticeable.

Example 1

184 parts by weight of diethyl barbituric acid (1 mol.) are intimately mixed with 223 parts by weight of α-bromisovaleryl urea (1 mol.), the mixture is heated in an oil bath while being stirred, the temperature of the bath being first brought to 155° C. The temperature is then slowly raised to about 160° and this temperature is held until the mixture is completely melted. It is not recommended that this temperature be exceeded to any considerable extent since the melt may then easily assume a yellow coloration. The beaker should be immersed in the bath up to the level of the surface of the melt. The melt is then poured into a pan and, after solidification, is ground. The product, on being rapidly heated, is found to have a melting point of 130° and, after being recrystallized several times, of 130–132°. The product obtained is easily soluble in alcohol and ether and particularly easily soluble in chloroform. The formula as determined by analysis is $C_{14}H_{23}O_5N_4Br$, in which the calculated percentage of bromine is 19.6% while that found by analyses was 19.4%, 19.4%.

Example 2

1 mol. of diethyl barbituric acid on being melted together with 2 mols of α-bromisovaleryl urea at a temperature of 140–150° gives a compound having a melting point of 117° (115–118°). The product obtained is easily soluble in alcohol and ether, particularly easily soluble in chloroform. The formula as determined by analysis is $C_{20}H_{34}O_7N_6Br_2$ in which the calculated percentage of bromine is 25.4% while that found by analyses was 25.5%, 25.8%.

Example 3

2 mols of diethyl barbituric acid on being fused together with 1 mol. of α-bromisovaleryl urea at a temperature of 170° gives a compound having a melting point of 164–168° (164–166°). The product obtained is easily soluble in alcohol and ether, and particularly easily soluble in chloroform. The formula as found by analysis is $C_{22}H_{35}O_8N_6Br$, in which the calculated percentage of bromine is 13.5% while that found by analyses was 13.1%, 13.2%.

Example 4

1 mol. of phenyl ethyl barbituric acid on being fused together with 1 mol. of α-bromisovaleryl urea at a temperature of about 160° gives a compound having a melting point of 131° (128–131°). The product obtained is easily soluble in alcohol and ether, and particularly easily soluble in chloroform. The formula as found by analysis is $C_{18}H_{23}O_5N_4Br$, in which the calculated percentage of bromine is 17.5% while that found by analyses was 17.6%, 17.8%.

Example 5

1 mol. of phenyl ethyl barbituric acid on being melted with 2 mols of α-bromisovaleryl urea at a temperature of about 145° gives a compound having a melting point of 119° (118–120°). The product obtained is easily soluble in alcohol and ether, and particularly easily soluble in chloroform. The formula as found by analysis is $C_{24}H_{34}O_7N_6Br_2$, in which the calculated percentage of bromine is 23.5% while that found by analyses was 23.5%, 23.1%.

*Example 6*

1 mol. of diethyl barbituric acid on being melted with 1 mol. of bromo-diethyl acetyl urea at a temperature of 150° gives a compound which melts at 96° (except for a slight cloudiness which disappears at 140°). After recrystallization from water-alcohol or ether-petroleum ether the melting point remains unchanged. The product obtained is easily soluble in alcohol, ether and chloroform. The formula as found by analysis is $C_{15}H_{25}O_5N_4Br$, in which the calculated percentage of bromine is 18.9%, while that found by analyses was 18.8%, 18.7%.

*Example 7*

2 mols of diethyl barbituric acid on being fused together with 1 mol. of bromo-diethyl acetyl urea at a temperature of 160° gives a compound which melts at 98° (except for a slight cloudiness which disappears at about 151°). After recrystallization from water-alcohol or ether-petroleum ether the melting point remains unchanged. The product obtained is easily soluble in alcohol ether and chloroform. The formula as determined by analysis is $C_{23}H_{37}O_8N_6Br$, in which the calculated percentage of bromine is 13.2% while that found by analyses was 13.1%, 13.5%.

*Example 8*

2 mols of phenyl ethyl barbituric acid on being fused together with 1 mol. bromo-diethyl acetyl urea at a temperature of 160° gives a compound which melts at 148–150°. After recrystallization from water-alcohol the melting point remains unchanged. The product obtained is easily soluble in alcohol and ether, and particularly easily soluble in chloroform and dioxane. The formula as determined by analysis is $C_{31}H_{37}O_8N_6Br$, in which the calculated percentage of bromide is 11.4% while that found by analyses was 11.68%, 11.36%.

*Example 9*

1 mol. of phenyl ethyl barbituric acid on being fused together with 1 mol. of bromo-diethyl acetyl urea at a temperature of 150° gives a compound which melts at 125–128°. After recrystallization from water-alcohol the melting point remains unaltered. The product obtained is easily soluble in alcohol.

While in the foregoing examples barbituric acid substituted by aliphatic or aromatic radicals is used it is understood that such radicals may be replaced by monovalent hydrocarbon radicals other than alkyl or aryl radicals.

I claim:

1. A process for obtaining compounds from barbituric acid di-substituted by monovalent hydrocarbon radicals and urea derivatives which comprises melting 5.5-di-ethyl barbituric acid with bromisovaleryl urea at a temperature below the melting point of the higher melting component.

2. The compound of the formula

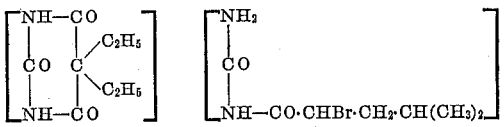

being a colourless crystalline substance with the melting point 130–132° C., soluble in alcohol and ether, easily soluble in chloroform and being a valuable soporific.

3. The compound of the formula

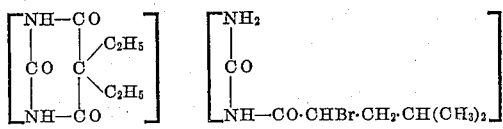

being a colourless crystalline substance with the melting point 117° C., soluble in alcohol and ether, easily soluble in chloroform and being a valuable soporific.

4. The compound of the formula

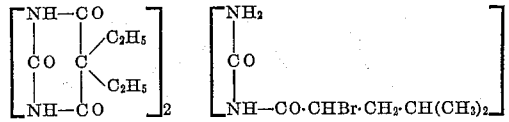

being a colourless crystalline substance with the melting point 164–168° C., soluble in alcohol and ether, easily soluble in chloroform and being a valuable soporific.

5. The compounds of the general formula

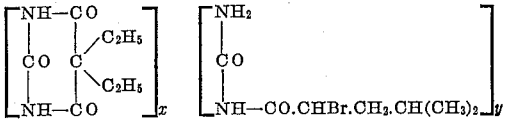

where $x$ and $y$ stand for one of the numbers one and two, being generally colourless crystalline substances, generally soluble in alcohol and ether, easily soluble in chloroform and being valuable soporifics.

WERNER URSUM.